US008794715B2

(12) United States Patent
Bennett et al.

(10) Patent No.: US 8,794,715 B2
(45) Date of Patent: Aug. 5, 2014

(54) ELECTRO-PNEUMATIC LATCHING VALVE SYSTEM

(75) Inventors: Mark A. Bennett, Grafton, OH (US); Robert J. Herbst, Avon, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 818 days.

(21) Appl. No.: 12/123,687

(22) Filed: May 20, 2008

(65) Prior Publication Data

US 2008/0271964 A1 Nov. 6, 2008

Related U.S. Application Data

(62) Division of application No. 10/784,717, filed on Feb. 23, 2004, now Pat. No. 7,396,089.

(60) Provisional application No. 60/449,710, filed on Feb. 24, 2003, provisional application No. 60/450,422, filed on Feb. 26, 2003, provisional application No. 60/466,820, filed on Apr. 30, 2003.

(51) Int. Cl.
*B60T 13/74* (2006.01)
*B60T 13/26* (2006.01)

(52) U.S. Cl.
CPC ............. *B60T 13/268* (2013.01); *B60T 13/263* (2013.01)
USPC .................... 303/3; 303/7; 303/28; 303/119.2

(58) Field of Classification Search
USPC ................. 137/322, 596.16; 303/3, 7, 28, 83, 303/119.2; 91/426, 433, 434
See application file for complete search history.

(56) References Cited

U.S. PATENT DOCUMENTS 3,507,212 A 4/1970 Matteson
3,833,269 A 9/1974 Trui et al.
(Continued)

FOREIGN PATENT DOCUMENTS

DE 2134067 A1 1/1973
EP 321 129 A2 6/1989
EP 0778188 6/1997

OTHER PUBLICATIONS

Bendix Commercial Vehicle Systems LLC, Bendix PP-1, PP-2, PP-5, PP-8 and RD-3 Push-Pull Type Control Valves, Service Data Sheet, Jul. 2006, 4 pages, Bendix Commercial Vehicle Systems LLC, Elyria Ohio.

(Continued)

*Primary Examiner* — Robert A Siconolfi
*Assistant Examiner* — James Hsiao
(74) *Attorney, Agent, or Firm* — Eugene E. Clair; Cheryl Greenly

(57) ABSTRACT

The electro-pneumatic latching valve system having an electrical switch unit that further includes an "apply" or "activate" switch, a "release" or "deactivate" switch, and a power supply. A first solenoid valve is in electrical communication with the activate switch and a second solenoid valve is in electrical communication with the deactivate switch. A pneumatic latching valve is in pneumatic communication with the first and second solenoid valves and a source of pressurized control and supply air is in pneumatic communication with the pneumatic latching valve and the solenoid valves. A terminal device, e.g., a spring brake, is in pneumatic communication with the latching valve, and the device is released or applied in response to pressurized supply air delivered to the device through the pneumatic latching valve in response to pneumatic control signals delivered to the pneumatic latching valve from the solenoid valves.

8 Claims, 5 Drawing Sheets

(56) References Cited

U.S. PATENT DOCUMENTS

| | | | |
|---|---|---|---|
| 4,116,493 A | 9/1978 | Hayashida | |
| 4,131,324 A | 12/1978 | Kurichh | |
| 4,199,196 A | 4/1980 | Teluo | |
| 4,247,154 A | 1/1981 | Shoji | |
| 4,284,308 A | 8/1981 | Hayashida | |
| 4,313,642 A | 2/1982 | Berisch | |
| 4,421,212 A | 12/1983 | Fleck | |
| 4,435,019 A | 3/1984 | Hayashida | |
| 4,493,510 A | 1/1985 | Deike | |
| 4,550,953 A | 11/1985 | Bartholomew | |
| 4,586,584 A | 5/1986 | Auman et al. | |
| 4,620,567 A * | 11/1986 | Kurtz | 137/627.5 |
| 4,638,837 A | 1/1987 | Buike et al. | |
| 4,758,811 A | 7/1988 | Slavin | |
| 4,763,646 A | 8/1988 | Lekholm | |
| 4,763,959 A | 8/1988 | Vandemotter | |
| 4,793,661 A | 12/1988 | Munro | |
| 4,877,294 A | 10/1989 | Kuhn et al. | |
| 4,878,464 A * | 11/1989 | Richeson et al. | 123/90.11 |
| 4,900,098 A | 2/1990 | Kuhn et al. | |
| 4,963,692 A | 10/1990 | Halabiya | |
| 4,979,783 A | 12/1990 | Johnson | |
| 5,042,883 A | 8/1991 | McCann et al. | |
| 5,056,874 A | 10/1991 | Hall | |
| 5,061,015 A * | 10/1991 | Cramer et al. | 303/7 |
| 5,113,907 A | 5/1992 | Russell | |
| 5,118,165 A | 6/1992 | Latvala | |
| 5,172,958 A | 12/1992 | Sell | |
| 5,365,791 A | 11/1994 | Padula et al. | |
| 5,429,427 A | 7/1995 | Gayfer | |
| 5,439,275 A | 8/1995 | Padula et al. | |
| 5,564,795 A | 10/1996 | Engle | |
| 5,584,465 A * | 12/1996 | Ochsenreiter | 251/65 |
| 5,746,484 A | 5/1998 | Gaughan et al. | |
| 5,788,338 A * | 8/1998 | Hart et al. | 303/3 |
| 5,927,327 A * | 7/1999 | Bezos et al. | 137/624.11 |
| 6,041,808 A | 3/2000 | Blanz | |
| 6,062,654 A | 5/2000 | Becker | |
| 6,079,790 A * | 6/2000 | Broome | 303/3 |
| 6,129,115 A | 10/2000 | Janssen | |
| 6,240,947 B1 | 6/2001 | Ho | |
| 6,290,309 B1 | 9/2001 | Korn | |
| 6,322,159 B1 * | 11/2001 | Eberling | 303/7 |
| 6,322,161 B1 | 11/2001 | Maslonka | |
| 6,351,199 B1 * | 2/2002 | Perini | 335/177 |
| 6,367,888 B1 * | 4/2002 | Kee et al. | 303/89 |
| 6,406,102 B1 * | 6/2002 | Arnold | 303/20 |
| 6,450,587 B1 | 9/2002 | MacGregor | |
| 6,474,362 B1 * | 11/2002 | Hope et al. | 137/625.64 |
| 6,488,343 B1 | 12/2002 | Eberling et al. | |
| 6,663,195 B1 * | 12/2003 | Arnold | 303/122.03 |
| 6,682,459 B1 * | 1/2004 | Knight | 477/183 |
| 6,685,281 B2 | 2/2004 | MacGregor | |
| 6,860,292 B2 | 3/2005 | Fasolino | |
| 6,896,339 B2 | 5/2005 | Moffitt et al. | |
| 7,156,058 B1 * | 1/2007 | Lou | 123/90.12 |
| 7,194,991 B2 * | 3/2007 | Lou | 123/90.12 |
| 7,354,118 B2 | 4/2008 | Herbst | |
| 7,396,089 B2 * | 7/2008 | Bennett et al. | 303/119.2 |
| 2003/0038533 A1 | 2/2003 | Bezzina | |
| 2003/0075977 A1 * | 4/2003 | Heller et al. | 303/118.1 |
| 2003/0116367 A1 * | 6/2003 | Kanno | 180/65.1 |
| 2003/0218377 A1 * | 11/2003 | Moffitt et al. | 303/127 |
| 2004/0012249 A1 | 1/2004 | Koelzer | |
| 2004/0150261 A1 * | 8/2004 | Kawaguchi et al. | 303/118.1 |
| 2004/0166863 A1 | 8/2004 | Kim | |
| 2004/0187674 A1 * | 9/2004 | Bennett et al. | 91/418 |
| 2008/0169701 A1 | 7/2008 | Herbst | |

OTHER PUBLICATIONS

USPTO Office Action on U.S. Appl. No. 12/077,018, mail date Oct. 14, 2009.

Amendment B filed in reply to Oct. 14, 2009 Office Action on U.S. Appl. No. 12/077,018, mail date Jan. 12, 2010.

* cited by examiner

ELECTRO-PNEUMATIC LATCHING VALVE SYSTEM

CROSS-REFERENCE TO RELATED APPLICATIONS

This patent application is a divisional of pending U.S. patent application Ser. No. 10/784,717 filed on Feb. 23, 2004 entitled "Electro-pneumatic Latching Valve System" which claims the benefit of U.S. Provisional Patent Application Ser. No. 60/449,710 filed on Feb. 24, 2003 entitled "Remote MV-3," U.S. Provisional Patent Application Ser. No. 60/450,422 filed on Feb. 26, 2003 entitled "Remote MV-X (Provisional No. 2)," and U.S. Provisional Patent Application Ser. No. 60/466,820 filed on Apr. 30, 2003 entitled "Apparatus and Method for Electro-pneumatic Air Brake System," the entire disclosures of which are incorporated as if fully rewritten herein.

STATEMENT REGARDING FEDERALLY FUNDED RESEARCH

This invention was not made by an agency of the United States Government nor under contract with an agency of the United States Government.

TECHNICAL FIELD OF THE INVENTION

This present invention relates generally to braking systems for heavy-duty vehicles and more specifically to a valve system that utilizes a combination of electronics and pneumatics to operate the parking brakes and emergency brakes of a vehicle.

BACKGROUND OF THE INVENTION

Conventional heavy-duty vehicle air brake systems typically use mechanical pneumatic push-pull control valves to control a vehicle's parking brakes. These large, pneumatic push-pull valves are usually placed within the vehicle's instrument panel, as are the pneumatic lines and connectors used to connect the brake control valves to the other components of the vehicle's air brake system. Dash mounting of these components may decrease pneumatic performance while consuming critical space in the vehicle's instrument panel which may ultimately result in dash configurations that are detrimental to the driver's comfort and convenience. Furthermore, installation of the pneumatic instrument panel controls requires complex, airtight connections during the final assembly phase of the vehicle. Thus, there is a need for a system that removes the pneumatic lines from a vehicle's dashboard while maintaining the basic functions and overall characteristics of currently used brake systems.

Some prior art braking systems have utilized electric controls to address the problem of limited dashboard space. Such systems typically include an electrical switch assembly mounted on or in the instrument panel for controlling the parking brakes with an electrically responsive valve located remotely from the dash components. One problematic aspect of these systems is that when electrical power is lost to the valve, the valve moves to its exhaust position, drops the parking brake line pressure to atmospheric pressure, and applies the vehicle's parking brake. Loss of electrical power or connectivity to a vehicle's brake system may be the result of loose terminal connections, broken wires, a dead battery, or other unforeseen events. As will be appreciated by those skilled in the art, inadvertent engagement of the parking brake may create an extremely dangerous situation if the vehicle is moving at any appreciable speed. Thus, there is a need for an air brake system that includes the use of electronics, but that prevents the inadvertent application of the vehicle's parking brakes should power to the brake control system be lost.

SUMMARY OF THE INVENTION

These and other disadvantages of the prior art are overcome by the present invention, which provides an electro-pneumatic system for controlling the parking and emergency brakes of a vehicle. The exemplary embodiment shown in the Figures utilizes a series of electrically controlled valves that are used to operate one or more pneumatic latching valves to apply or release a vehicle's parking brakes. Thus, the logic of this system and method of includes both electrical and pneumatic components.

The electro-pneumatic latching valve system of the present invention typically includes a switch unit having an electric "apply" or "activate" switch, a "release" or "deactivate" switch, and a power supply. In accordance with an exemplary embodiment, an electro-pneumatic latching valve unit includes a first valve is in electrical communication with the activate switch and a second valve is in electrical communication with the deactivate switch. A third valve, which is referred to herein as a "pneumatic latching valve" is in pneumatic communication with the first and second valves. A source of pressurized air is in pneumatic communication with all three valves in each valve unit. The first and second valves deliver control air to the latching valve in response to either an electric "apply" signal or an electric "release" signal and the latching valve opens or closes in response to these signals. A terminal device, such as a spring brake, is in pneumatic communication with the latching valve and is released in response to pressurized supply air delivered to the device through the open latching valve. The device is applied when the latching valve closes and the pressurized supply air is exhausted from the device through the latching valve.

In alternate embodiments of the present invention, the electro-pneumatic latching valve system is incorporated into the parking and emergency brake system of vehicles having the tractor and trailer configuration and vehicles having the truck configuration or mode. The electrically controlled valves are used only to induce a "change of state" in the vehicle's parking brakes, while the pneumatic latching valve is the system component that actually applies or releases the vehicle's brakes. Once the pneumatic latching valve has applied or released the parking brakes, any loss of electrical power to the valves or to the brake system, will not result in a change in the state of the vehicle's parking brakes, i.e., will not automatically apply the vehicle's parking brakes. As indicated previously, this aspect of the present invention is particular advantageous from a safety perspective.

Further advantages of the present invention will become apparent to those of ordinary skill in the art upon reading and understanding the following detailed description of the preferred embodiments.

BRIEF DESCRIPTION OF THE DRAWINGS

The accompanying drawings, which are incorporated into and form a part of the specification, schematically illustrate one or more exemplary embodiments of the invention and, together with the general description given above and detailed description of the preferred embodiments given below, serve to explain the principles of the invention.

DETAILED DESCRIPTION OF THE INVENTION

The present invention provides an apparatus for use in controlling an air brake system and other pneumatic devices. The exemplary embodiment of the present invention utilizes a series of electrically controlled valves that are in turn used to operate at least one pneumatic latching valve to apply or release a vehicle's parking brakes. Thus, the logic of the system and method of the present invention includes both electrical and pneumatic components. The electrically controlled valves, which in the exemplary embodiment are solenoid valves, are used only to induce a "change of state" in the vehicle's parking brakes, as described below. With reference to the Figures in general, a series of small capital letters are used to designate the ports of the various valves included in the system of the present invention. The letter "S" refers to "supply," the letter "C" refers to "control," the letter "D" refers to "delivery," and the letter "E," refers to "exhaust." In the context of this invention, control air is used as a pneumatic signal that opens or closes a latching valve, while supply air is used to apply or release a terminal device such as a spring brake.

Figure 1:
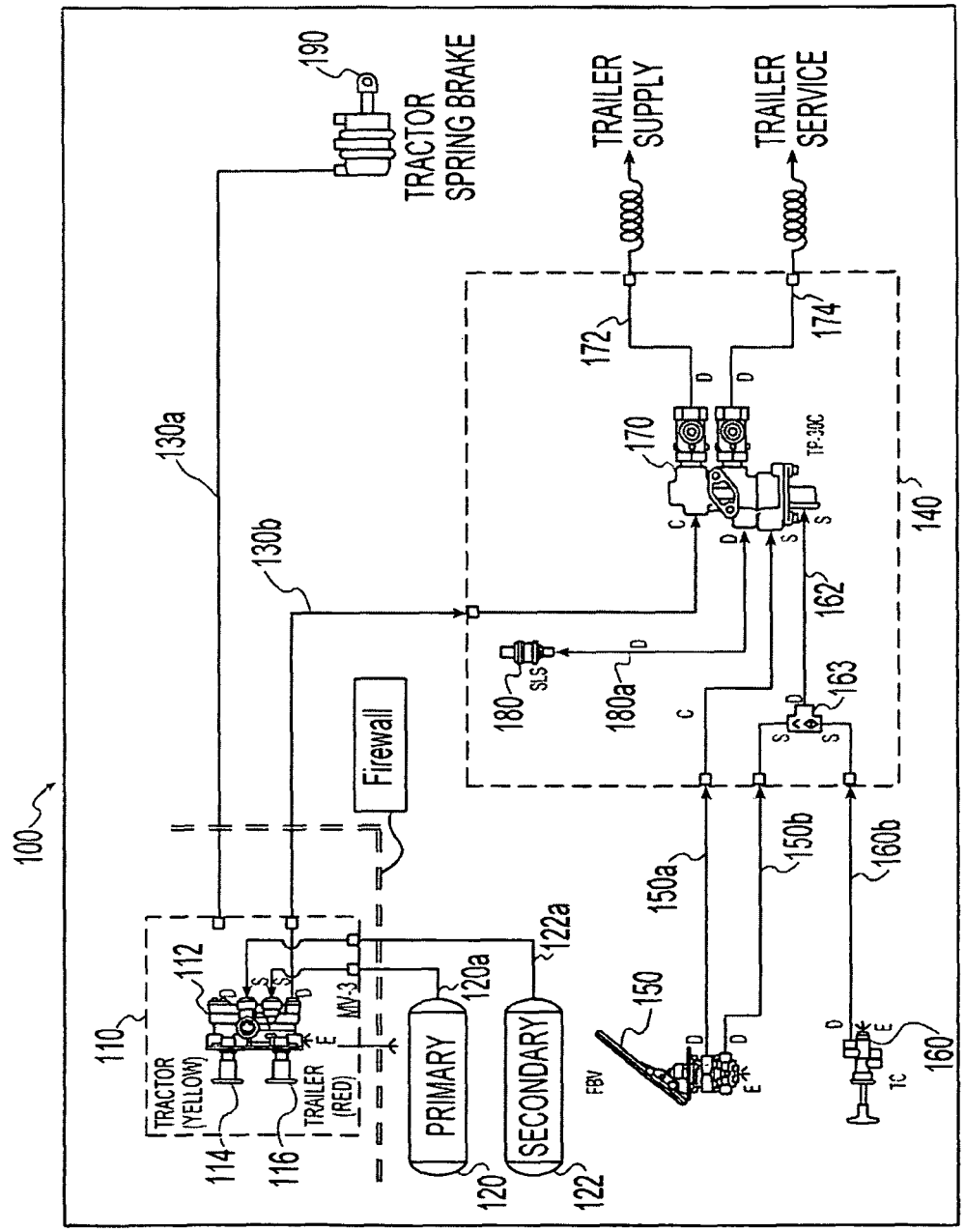
FIG. 1 is a schematic representation of a prior art air brake system that utilizes pneumatics solely to operate the braking system of a vehicle.

To distinguish the characteristics of the present invention from current state of the art pneumatic systems, FIG. 1 provides a partial schematic representation of a prior art air brake system 100 that utilizes pneumatic circuits exclusively. In FIG. 1, all lines depicted in the drawing are pneumatic lines with no electrical circuits being present. The dashboard module 110 includes five (5) pneumatic lines of ⅜ inch diameter and several feet in length. These components are present in the vehicle's cab and traverse the firewall between the cab and the exterior portion of the vehicle.

Primary reservoir air reservoir 120 and secondary air reservoir 122 supply pressurized air to the parking control valve unit 112 by way of supply lines 120a and 122a. Dash valve 114 represents the "yellow button" as it is referred to by those skilled in the art, and includes a combination park pneumatic push-pull plunger. Dash valve 116 represents the "red button" as it is referred to by those skilled in the art, and includes a trailer park control and air supply pneumatic push-pull plunger. The pneumatic logic present in this system enables buttons 114 and 116 to "pop" out automatically in the event the air reservoirs fail and fall below a prescribed pressure, such as, for example, about 40 psi for valve 116 (red) and about 20 psi for valve 114 (yellow).

Delivery line 130a supplies pressurized air to spring brake 190, while trailer supply line 130b supplies pressurized air to tractor protection module 140 and tractor protection valve 170. By way of primary delivery line 150a or secondary delivery line 150b, foot brake valve 150 delivers pressurized air to valve 170 directly or through double check valve 163. Likewise, trailer control valve 160 delivers pressurized air to valve 170 by way of delivery lines 160a and 162. Tractor protection valve 170 may include a service line quick release valve and supply line quick release valve and delivers pressurized air to trailer supply line 172 and trailer service line 174 as well as stop light switch 180 by way of delivery line 180a.

Figure 2:
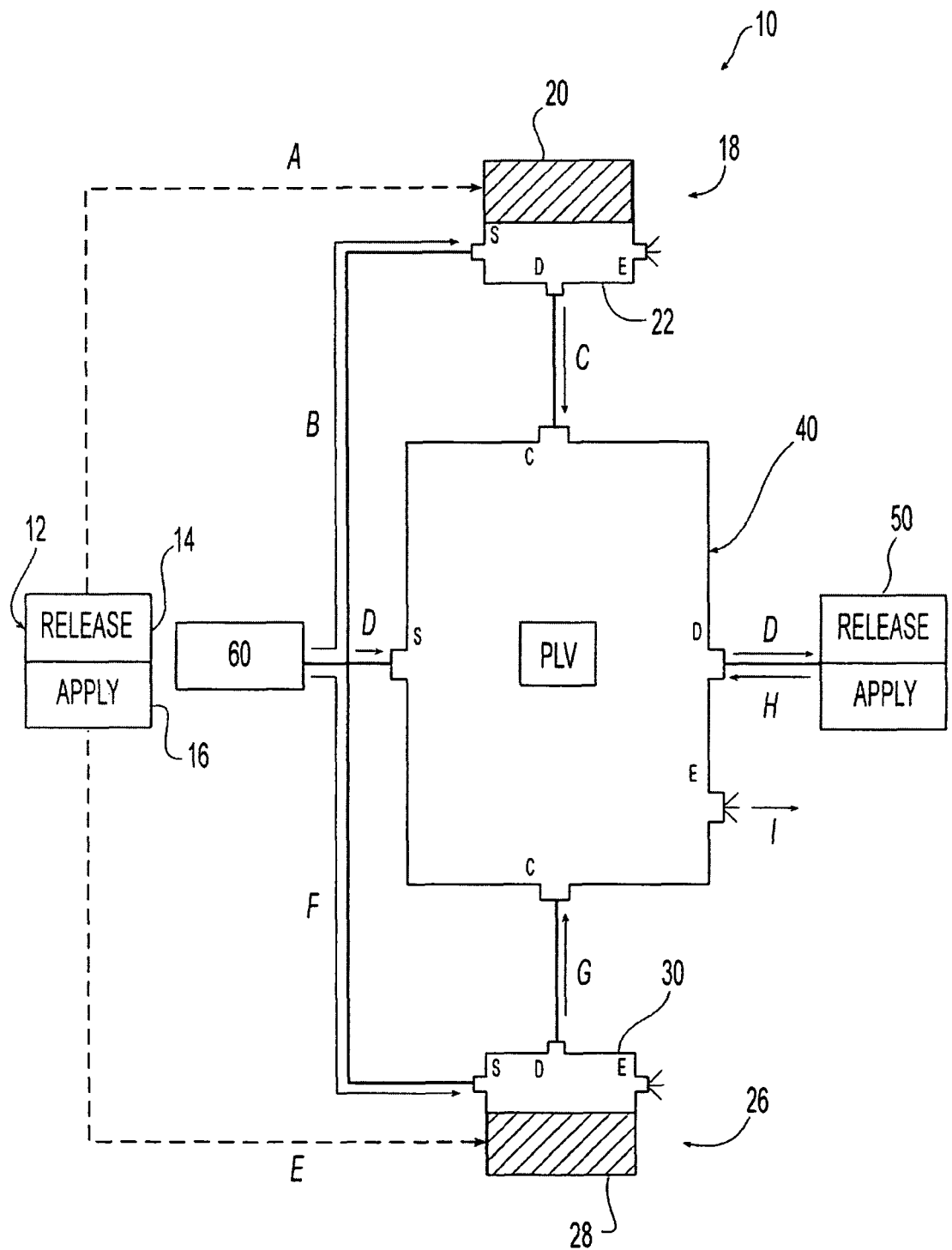
FIG. 2 is a block diagram showing the electro-pneumatic latching valve unit of the present invention.

With reference to FIG. 2, an exemplary and generic embodiment of electro-pneumatic latching valve system 10 includes a switch unit 12, a first electric control valve 18, a second electric control valve 26, and a pneumatic latching valve 40. A terminal device 50, and an air reservoir 60 are also included in the exemplary embodiment. The two operational modes of the electric valves which may be solenoid valves are null or closed, and energized or delivery. The pneumatically latching valve possesses the same two operational modes although its input is pneumatic pressure, not solenoid current. The description of the exemplary embodiment refers to the electric control valves as solenoid valves; however, other electrically controllable valves or pneumatic valves may be used to control the operation of the pneumatically latching valve including, but not limited to piezoelectric valves and micro machine valves.

In FIG. 2, a series of electrical lines connects the switch unit to the electric valves, and a plurality of pneumatic lines connects the air reservoir to the electric valves, the latching valve, and the terminal device. Pressurized air is delivered from reservoir 60 to the supply ports of valves 18 and 26 (see arrows B and F) and to the supply port of pneumatic latching valve 40 (see arrow D). This "black air" remains deadheaded at these ports until the operator of the vehicle actuates one of the switches in unit 12. Although not shown, an electronic control unit (ECU) in the form of a printed circuit board or similar device may be placed in-line between the switch unit and the solenoid assemblies for the purposes of integrating additional functionality into the system.

In the exemplary embodiment shown in the Figures, terminal device 50 is a spring brake actuator that utilizes pressurized air to apply or release the parking brakes of a vehicle. With reference to FIG. 2, if the operator desires to release, i.e., deactivate, the parking brakes, release switch 14 is actuated. Upon actuation, electric current travels from release switch 14 to release valve 20 (see arrow A). In response to the electrical signal received at release valve 20, the delivery port of solenoid valve 22 is opened and pressurized air is delivered to the top control port of pneumatic latching valve 40 (see arrow C). Upon receiving this pneumatic signal, the piston within latching valve 40 moves from its closed state and the supply port of valve 40 is opened allowing pressurized air to pass through to the delivery port of the valve and into the spring brake, i.e., terminal device 50 (see arrow D). The pressurized air forces the spring within the brake chamber to retract and the vehicle's parking brakes are released allowing the vehicle to move.

When the operator releases switch 14, valve 22 closes and airflow through the valve ceases. Pressurized air that was delivered to the control port of pneumatic latching valve 40 is exhausted through the exhaust port of solenoid valve 22. Although solenoid valve 22 is closed, and there is no air passing though the valve, the parking brakes of the vehicle remain released because pressurized supply air is still being delivered from reservoir 60 to the spring brake. Thus, valve 40 is referred to as a pneumatic "latching" valve because continuous current to the release valve is not required for the system to maintain continuous air flow to the terminal device. This aspect of the present invention is particularly advantageous over prior art systems because loss of electrical power or connectivity to the parking brake system does not automatically result in the application of the vehicle's parking brakes.

Again with reference to FIG. 2 if the operator desires to apply, i.e., activate, the parking brakes, apply switch 16 is actuated. Upon actuation, electric current travels from apply switch 16 to apply valve 28 (see arrow E). In response to the electrical signal received at apply valve 28, the delivery port of solenoid valve 30 is opened and pressurized air is delivered to the bottom control port of pneumatic latching valve 40 (see arrow G). Upon receiving this pneumatic signal, the piston within valve 40 returns to its closed state, terminating the flow of pressurized air through the valve to the delivery port and into the spring brake, i.e., terminal device 50. The exhaust port of pneumatic latching valve 40 then opens and air from the spring brake actuator is exhausted to the atmosphere (see arrows H and I). Exhausting the pressurized air in this manner causes the spring within the brake chamber to return to its normal bias and the vehicle's parking brakes are applied.

When the operator releases switch 16, valve 30 closes and airflow through the valve ceases. Pressurized air that was delivered to the control port of pneumatic latching valve 40 is exhausted through the exhaust port of solenoid valve 30. Although solenoid valve 30 is closed, and there is no air passing though the valve, the parking brakes of the vehicle remain applied because no pressurized air is being delivered from reservoir 60 to the spring brake. As stated above, valve 40 is referred to as a pneumatic latching valve because continuous current to the apply solenoid is not required for the system to prevent air flow to the terminal system device. Again, loss of electrical power or connectivity to the parking brake system does not automatically result in a change of state in the vehicle's parking brakes.

Figure 3:
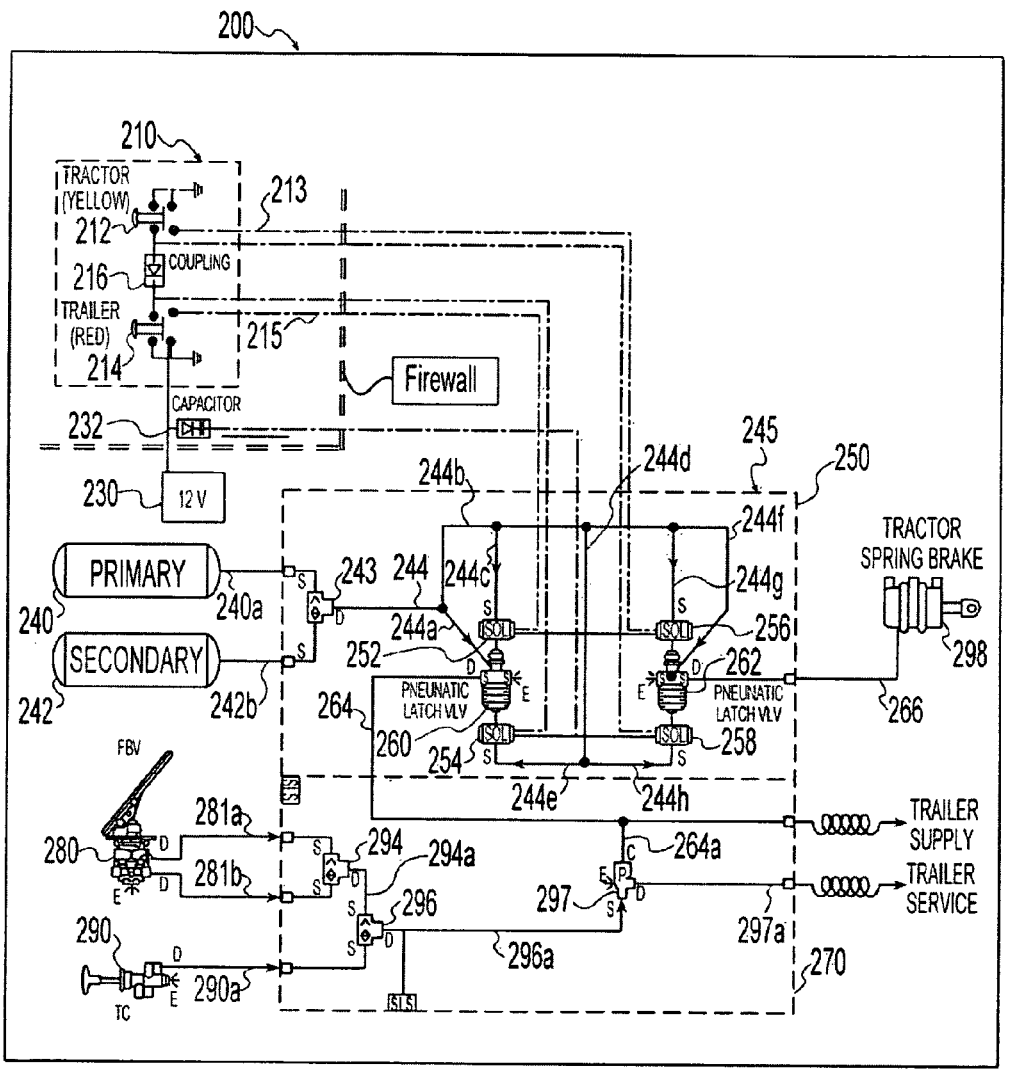
FIG. 3 is a schematic representation of the electro-pneumatic latching valve unit of the present invention incorporated into an air brake system for a vehicle having both a tractor portion and a trailer portion.

Electro-pneumatic latching valve system 10 may be incorporated into larger, more complex tractor/trailer brake system. FIG. 3 provides a partial schematic of an exemplary embodiment of brake system 200. This system comprises two basic modules or subsystems: driver interface subsystem 210 and brake control subsystem 245. Brake control subsystem 245 further includes a remote module 250 and tractor protection module 270. The components of driver interface subsystem 210 are typically mounted on or within the dashboard of the vehicle, while remote module 250 is typically mounted to an exterior surface of the cab of the vehicle and includes subcomponents that are both internal and external to the cab. The tractor protection module 270 also typically includes subcomponents that are both internal to and external to the cab of the vehicle.

As shown in FIG. 3, driver interface system 210 comprises tractor and combination park electrical switch unit (the "yellow button") 212 and trailer park and supply electrical switch unit (the "red button") 214. In the exemplary embodiment, these buttons are 3-position, momentary on-off-on, push-pull devices that provide the operator with an interface to the vehicle's parking system, and serve as the input devices to the optional electronic control unit (see FIG. 5), which drives electric valves 252, 254, 256, and 258, which in the exemplary embodiment are solenoid valves. These buttons may be backlit for visibility and may include a status indicator in the form of variable light intensity or an LED. The buttons are lit based either on input from pressure switches or on valve position, which typically includes contacting or non-contacting indicator switches that indicate whether the park brakes are applied or released.

A button coupling diode 216 is situated between assemblies 212 and 214 and couples the function of the trailer and tractor components of the system. This coupling can be done with a diode or an equivalent device such as an electrical driver circuit that emulates the logic of a diode or may be implemented pneumatically with a check valve placed between the park sides of the yellow and red valves. Typically, the coupling logic utilized by a diode or other electronics is designed such that operating the park function of the yellow button unit automatically operates the park function of the red button unit. This functionality can be characterized as a "single-button park feature." The electro-pneumatic system of the present invention functions such that if the two status lights on the valve unit are extinguished, then a single pull of the yellow button will pass current to both the yellow and red park solenoids, thus lighting both the red and yellow buttons once the parking action is complete.

In the exemplary embodiment shown in FIG. 3, tractor brake circuit 213 connects yellow button 212 to solenoid valve 256 and solenoid valve 258 and provides an electrical pathway for activating these two solenoids. Likewise, trailer brake circuit 215 connects red button 214 to solenoid valve 252 and solenoid valve 254 and provides an electrical pathway for activating these two solenoids. It should be noted that in the embodiment that includes an electronic control unit circuits 213 and 215 either connect the buttons to the electronic control unit or connect the electronic control unit to the solenoids (see FIG. 5).

The power for operating circuits 213 and 215 is provided by a power source 230, which is typically a 12V battery, and a capacitor 232 that is in electrical communication with both driver interface subsystem 210 and brake control subsystem 245. In the event of electrical power loss, capacitor 232 provides energy for at least one additional parking application; thus, the operator may still park the vehicle despite the loss of electrical power to the brake system. A diode or other isolation circuit may be employed to ensure that the capacitor's charge is preserved only for the parking system, and not discharged through the remainder of the vehicle electrical system. In alternate embodiments, a simple capacitor, a complex capacitive circuit, or other suitable means provides backup power. In general, power supply 230 and capacitor 232 comprise primary and secondary power supplies that provide the system with certain protections, conditioning, and backup emergency parking capability.

Figure 5:
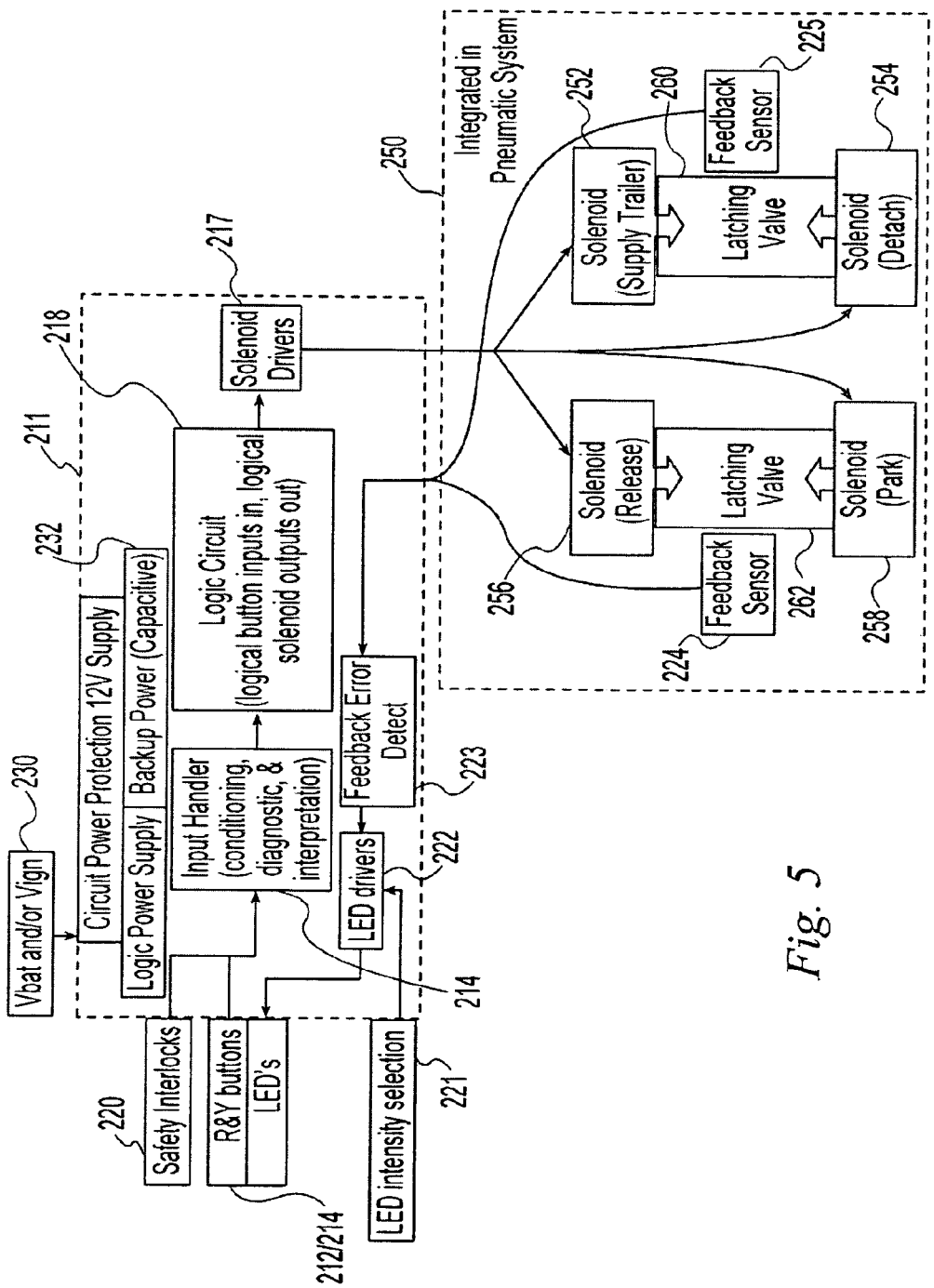
FIG. 5 is a flowchart showing an alternate embodiment in which a electronic control unit is utilized to integrate certain functions of the air brake system of FIG. 3.

The embodiment shown in FIG. 5 includes a printed circuit board 211 that serves as the electronic control unit for the brake system. The printed circuit board can be placed in the vehicle's dash or it may be attached to the parking control subsystem. In one embodiment, the brake control subsystem 245 is in an enclosure mounted on the back-of-cab wall, and printed circuit board 211 is mounted on, attached to, or integrated with the parking control subsystem. The printed circuit board may utilize dash buttons with hall effect sensors, and most or all of the support components or modules for the button unit, i.e., buttons 212 and 214, hall sensors, LEDs, LED intensity selection 221, LED drivers 222, feedback error detection 223, feedback sensors 224 and 225, solenoid drivers 217, backup power supply 232, and interlock support/interface 223, is integrated into the printed circuit board. The printed circuit board may also include a microprocessor that includes an input handler module 219 and a logic circuit or module 218.

With reference to FIG. 3, an exemplary embodiment of remote module 250 further comprises a plurality of electric valves (e.g., solenoid valves), as well as two pneumatically latching valves. Although all four electric valves in the exemplary embodiment are basically identical, each solenoid performs a different function. These subcomponents may be mounted together within a single casting or molding. By way of example, each solenoid may be a 3-way/2-position normally closed solenoid valve that pilots the pneumatic latch valve from one state to another based on the operator's commands.

In the exemplary embodiment, "red" trailer supply valve 252 is situated above pneumatically latching trailer side valve 260 and "red" trailer park solenoid 254 is situated below valve 260; however, these two solenoids may be packaged together in a single housing and may reside on top of or between the latching valves. This combination of solenoids and pneumatic latching valve comprise the portion of the system that pneumatically operates the braking system of the vehicle's trailer (see FIG. 3). Trailer supply line 264 exits pneumatically latching valve 260 and provides pressurized air to tractor protection module 270 by way of line 264a. The trailer supply line feeds the trailer reservoirs and applies or releases the parking and/or emergency brakes.

"Yellow" tractor park release solenoid valve 256 is situated above pneumatically latching tractor side valve 262 and "yellow" tractor park apply solenoid valve 258 is situated below pneumatically latching valve 262; however, these two solenoids may be packaged together in a single housing and may reside on top of or between the latching valves. In the exemplary embodiment, this combination of solenoids and pneumatically latching valve comprise the portion of the system that pneumatically operates spring brake 298, which is located in the tractor portion of the vehicle. Spring brake 298 is supplied with pressurized air by tractor spring brake delivery line 266.

Figure 4:
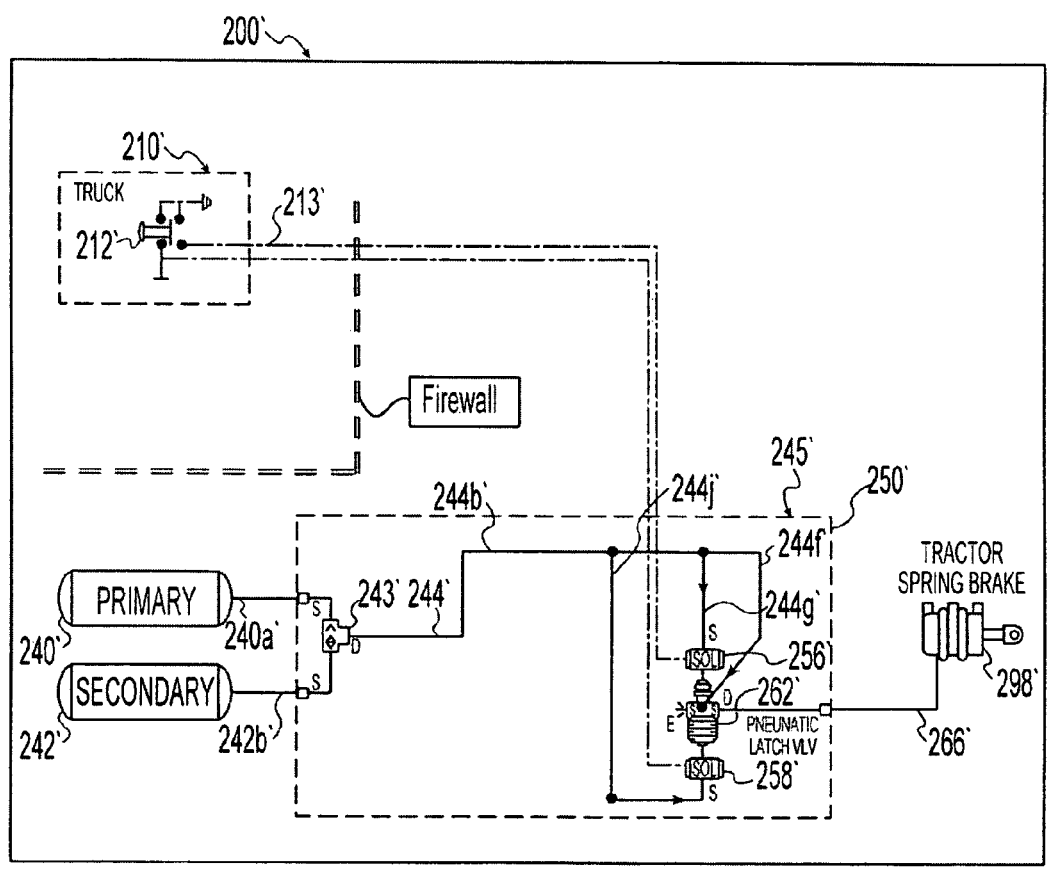
FIG. 4 is a schematic representation of the electro-pneumatic latching valve unit of the present invention incorporated into an air brake system for a vehicle having only a truck, bus, or non-towing vehicle portion.

In the embodiments shown in FIGS. 3 and 4, each pneumatic latching valve is operated by solenoid-piloted air rather than the operator's palm. Current commercially available valves would normally include a "mushroom" button that is manipulated, i.e., pushed in and pulled out by the operator. Here the button has been removed, and the valves are "pushed in" or "pulled out" by pressurized control air from the electrically controlled valves. In the exemplary embodiment, each pneumatically latching valve "pops" automatically under a prescribed air pressure, such as, for example, about 40 psi for trailer brake actuator 214 and about 20 psi for tractor brake actuator 212 regardless of the state of the solenoids.

In the exemplary embodiment, this pressurized air is supplied to the system by primary air reservoir 240 and/or secondary air reservoir 242. Primary supply line 240a, which runs from primary air reservoir 240, and secondary supply line 242b, which runs from secondary air reservoir 242 both connect to double check valve 243, which delivers the greater of the two input pressures. Dual air supply line 244 exits double check valve 243 and then branches into multiple supply lines that provide the solenoids and the pneumatically latching valves with pressurized control and supply air from supply line 244. As shown in FIG. 3, pneumatically latching valve 260 is supplied by supply line 244a and pneumatically latching valve 262 is supplied by supply line 244f. The solenoids are supplied by supply lines 244b and 244d, which are further split into additional supply lines. Solenoid 252 is supplied by supply line 244c, solenoid 254 is supplied by supply line 244e, solenoid 256 is supplied by supply line 244g, and solenoid 258 is supplied by supply line 244h. A dual air gauge (not shown) may be added to system 200 to monitor the air pressure within the pneumatic latch valves, which are the primary outputs of the system.

As shown in FIG. 3, an exemplary embodiment of tractor protection module 270 includes two double check valves and a service line shut-off valve. Primary and secondary air reservoirs 240 and 242 supply pressurized air to foot brake valve 280, which is in communication with double check valve 294 by way of primary foot valve delivery line 281a and secondary foot valve delivery line 281b. Double check valve 294 is in communication with a stop light switch (SLS) and also with double check valve 296 by way of delivery line 294a. Primary and secondary air reservoirs 240 and 242 also supply pressurized air to trailer control valve 290, which is in communication with double check valve 296 by way of trailer control delivery line 290a. Double check valve 296 is in communication with a stop light switch (SLS) and service line shut-off valve by way of delivery line 296a, which delivers to valve 297 the greater of the air pressures received from foot brake valve 280 and trailer control valve 290. Service line shut-off valve 297 delivers pressurized air to trailer service line 297a and provides the tractor protection function by closing the trailer service line in the event that the tractor supply reservoirs have failed or the trailer is otherwise damaged. The trailer service line pressure is proportional to the braking being done by foot or by hand, and is used by the trailer to apply the proportional amount of service brakes for routine stopping of the vehicle.

As with the generic embodiment, when one or the other brake actuator control buttons (yellow and red buttons) is pushed in by the operator, electrical current flows to the solenoid valve located on top the pneumatic latching valve. The solenoid opens and delivers black or control air to the piston within the pneumatic latching valve. The pneumatically latching valve opens, delivering supply air to the terminal system component, e.g., the tractor spring brake. When the brake actuator is released, the top solenoid valve closes and air flow through the solenoid valve ceases, and air delivered to the top of the pneumatically latching valve is exhausted. However, the valve remains open and continues to deliver supply air to the spring brake. When a yellow or red button is pulled outward from the neutral position, the above-described process is reversed. Control air from the solenoid valve on the bottom of the pneumatically latching valve pushes the valve back to the closed position, thereby shutting off the air flow from supply to delivery, and exhausting pressurized air to atmosphere. Thus, as previously stated, even though the electrical power to the system may fail, the pneumatic latching valve remains in its most recent state, i.e., it does not automatically apply the parking brakes due to an electrical failure.

FIG. 4 provides a schematic representation of the present invention as applied to an air brake system for a truck, bus, or non-towing vehicle. In this embodiment, brake system 200' includes a driver interface subsystem 210' and brake control subsystem 245'. Brake control subsystem 245' further includes a remote module 250' and a spring brake 298'. Driver interface system 210' comprises a single electrical switch 212' for energizing solenoids 256' and 258', which in turn controls the operation of pneumatic latching valve 262'. Pressurized air is supplied by primary reservoir 240' and secondary reservoir 242' and travels through lines 240a' and 242b' to double check valve 243'. Pressurized air is then delivered to the various system components by way of pneumatic lines 244', 244b', 244j', 244f', 244g', and 266'.

A number of variations are possible with the system of this invention. For example: (i) the solenoids may be assembled as a manifold at the vehicle's firewall such that all electrical connections are on the cab-side of the firewall and all the pneumatic connections are on the engine-side of the firewall; (ii) a time-delay circuit or strategy may be employed such that risk of unintended actuation of the parking brakes is reduced; (iii) the actuators can be any working switch logic, either driver-manipulated (push-pull buttons, flippers, sliders, dials)

or coupled to another system (transmission shifter "park" position, for example); (iv) the system can receive additional logic, information, or control from an ABS ECU with the authority to control the brake system by a dedicated network protocol such as CAN; (v) the system may employ a dedicated ECU or the system may receive only advisory information, not command information, from an engine or chassis ECU other than an ABS ECU; (vi) the solenoid control may also be replaced by pneumatic pilot control using pneumatic valves that would emulate the operation of the 3-way/2-position, normally closed solenoids described above, e.g., the self-returning TH-3 (Bendix).

The present invention also provides a means for allowing safety interlocks to be integrated into a vehicle's brake system as simple electrical switch inputs. In general, the safety interlocks of the present invention (i) prohibit parking release based on information obtained from devices around a vehicle that indicates a safety concern regarding movement of the vehicle and/or (ii) force the vehicle into park based on information obtained from devices around a vehicle that indicates the driver, upon exiting the vehicle, has forgotten to park the vehicle. In the exemplary embodiment, safety interlock and theft deterrence are achieved simply by connecting existing vehicle switches (ignition key, brake light switch, door switch, safety belt switch, etc.) to an optional printed circuit board. The printed circuit board, if included, may be placed in an enclosure and may be located in the dash, integrated with existing buttons, or located on the in-the-cab side of the parking control subsystem.

In addition to air brake systems, the electro-pneumatic valve system of the present invention is compatible with any number of pneumatic systems in which a change of state is not desirable should electric power to the system or its components be lost. For example, this electro-pneumatic valve system may be used with a variety of pneumatic lift devices, including, but not limited to, powered doors, axle shifters, wheel chair lifts, cherry pickers, and air suspension systems.

While the above description contains many specificities, these should not be construed as limitations on the scope of the invention, but rather as exemplification of certain preferred embodiments. Numerous other variations of the present invention are possible, and is not intended herein to mention all of the possible equivalent forms or ramifications of this invention. Various changes may be made to the present invention without departing from the scope or spirit of the invention.

What is claimed:

1. An electro-pneumatic valve system, comprising:
   (a) a first valve adapted to operatively respond to a momentary electrical signal for opening the first valve, the first valve delivering a first momentary pneumatic control signal when open;
   (b) a second valve adapted to operatively respond to a momentary electrical signal for opening the second valve, the second valve delivering a second momentary pneumatic control signal when open;
   (c) a third valve in communication with the first and second valves, and wherein the third valve is adapted to operatively respond to the first and second momentary pneumatic control signals, the third valve opening upon receiving the first momentary pneumatic control signal and remaining open until receiving the second momentary pneumatic control signal;
   (d) an electrical switch unit in electrical communication with the first and second valves for sending the momentary electrical signals;
   (e) a source of pressurized control air in communication with the first and second valves;
   (f) a source of pressurized supply air in communication with the third valve, and wherein the pressurized supply air passes through the third valve when the valve is open; and
   (g) a terminal device in communication with the third valve, and wherein the terminal device is adapted to receive pressurized supply air to release an associated parking brake when the third valve is open and to exhaust pressurized supply air to apply the associated parking brake when the third valve receives the second momentary pneumatic control signal and is closed.

2. The system of claim 1, further comprising an electrical control unit in electrical communication with the switch unit and the valves for controlling the operation of the system.

3. The system of claim 1, wherein the first and second valves are solenoid valves, piezoelectric valves, or micro machine valves.

4. The system of claim 1, wherein the terminal device is a spring brake or pneumatic lift device.

5. An electro-pneumatic system for controlling the parking and emergency brakes of a vehicle, wherein the vehicle includes a truck portion, comprising:
   (a) a driver interface, wherein the driver interface further comprises an electrical switch unit for sending electrical signals;
   (b) a brake control subsystem in electrical communication with the driver interface, and wherein the brake control subsystem further comprises:
   (i) a first valve adapted to operatively respond to a momentary electrical signal for opening the first valve, the first valve delivering a first momentary pneumatic control signal when open;
   (ii) a second valve adapted to operatively respond to a momentary electrical signal for opening the second valve, the second valve delivering a second momentary pneumatic control signal when open;
   (iii) a third valve in communication with the first and second valves, and wherein the third valve is adapted to operatively respond to the first and second momentary pneumatic control signals, the third valve opening upon receiving the first momentary pneumatic signal and remaining open until receiving the second momentary pneumatic signal; and
   (c) a source of pressurized control air in communication with the first and second valves;
   (d) a source of pressurized supply air in communication with the third valve, and wherein the pressurized supply air passes through the third valve when the valve is open; and
   (e) at least one spring brake in communication with the third valve for receiving and exhausting the pressurized supply air, and wherein the spring brake is released to release the parking brake upon receiving the supply air in response to the third valve receiving the first momentary pneumatic control signal; the spring brake remaining released until the third valve receives the second momentary pneumatic control signal and exhausts the supply air.

6. The system of claim 5, further comprising a primary electrical power supply in electrical communication with the driver interface system.

7. The system of claim 5, further comprising a secondary electrical power supply in electrical communication with the driver interface system.

8. The system of claim 5, wherein the first and second valves are solenoid valves.

* * * * *